US007965659B1

(12) United States Patent
Doran (10) Patent No.: US 7,965,659 B1
(45) Date of Patent: *Jun. 21, 2011

(54) METHOD AND SYSTEM FOR ACTUALLY IDENTIFYING A MEDIA SOURCE IN A REAL-TIME-PROTOCOL STREAM

(75) Inventor: Christopher M. Doran, Santa Clara, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 255 days.

This patent is subject to a terminal disclaimer.

(21) Appl. No.: 12/133,474

(22) Filed: Jun. 5, 2008

Related U.S. Application Data (63) Continuation of application No. 10/629,360, filed on Jul. 29, 2003, now Pat. No. 7,417,989.

(51) Int. Cl.
*H04L 12/16* (2006.01)
(52) U.S. Cl. .................. 370/260; 709/204; 709/231
(58) Field of Classification Search .................. 370/260; 709/204, 231
See application file for complete search history.

(56) References Cited

U.S. PATENT DOCUMENTS

| | | | |
|---|---|---|---|
| 4,870,408 A | 9/1989 | Zdunek et al. |
| 5,442,809 A | 8/1995 | Diaz et al. |
| 5,568,511 A | 10/1996 | Lampe |
| 5,710,591 A | 1/1998 | Bruno et al. |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |
| 5,983,099 A | 11/1999 | Yao et al. |
| 6,014,556 A | 1/2000 | Bhatia et al. |
| 6,032,051 A | 2/2000 | Hall et al. |
| 6,041,241 A | 3/2000 | Willey |
| 6,119,017 A | 9/2000 | Cassidy et al. |
| 6,178,323 B1 | 1/2001 | Nagata |
| 6,381,467 B1 | 4/2002 | Hill et al. |
| 6,490,452 B1 | 12/2002 | Boscovic et al. |
| 6,501,763 B1 | 12/2002 | Bhagavath et al. |
| 6,526,377 B1 | 2/2003 | Bubb |
| 6,567,929 B1 | 5/2003 | Bhagavath et al. |

(Continued)

FOREIGN PATENT DOCUMENTS

EP 0 817 457 1/1998

(Continued)

OTHER PUBLICATIONS

International Search Report from International Application No. PCT/US02/31411, dated Mar. 4, 2003.

(Continued)

*Primary Examiner* — Creighton Smith (57) ABSTRACT

A method and system for actually identifying a source of real-time media within an RTP stream. A sending node such as a client station or conference server inserts into an RTP header of at least one packet of the RTP stream an actual identification of the media source, such as a text representation of the name or e-mail address of a user who provided the media or a phone number of the station that provided the media. For instance, the sending node could insert the actual identification into an RTP header extension. A receiving node can then receive the RTP stream, read the actual identification from the RTP header, and present the actual identification to a user while playing out the underlying media to the user.

26 Claims, 5 Drawing Sheets

U.S. PATENT DOCUMENTS

| | | | |
|---|---|---|---|
| 6,771,639 B1 | 8/2004 | Holden | |
| 6,771,644 B1 | 8/2004 | Brassil et al. | |
| 6,788,946 B2 | 9/2004 | Winchell et al. | |
| 6,865,604 B2* | 3/2005 | Nisani et al. | 709/224 |
| 6,931,007 B2* | 8/2005 | Jones | 370/392 |
| 6,934,756 B2 | 8/2005 | Maes | |
| 6,963,931 B2* | 11/2005 | Bunn et al. | 709/246 |
| 7,151,749 B2* | 12/2006 | Vega-Garcia et al. | 370/241.1 |
| 7,221,660 B1 | 5/2007 | Simonson et al. | |
| 7,272,658 B1* | 9/2007 | Edelman et al. | 709/231 |
| 7,315,898 B2* | 1/2008 | Kohno | 709/230 |
| 7,385,921 B2* | 6/2008 | Itakura et al. | 370/230 |
| 7,443,797 B2* | 10/2008 | Cheung et al. | 370/236 |
| 7,463,652 B2* | 12/2008 | Karol et al. | 370/476 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2003/0072269 A1 | 4/2003 | Teruhi et al. | |
| 2003/0107994 A1 | 6/2003 | Jacobs et al. | |
| 2003/0114156 A1 | 6/2003 | Kinnavy | |
| 2003/0231634 A1 | 12/2003 | Henderson et al. | |
| 2004/0028010 A1 | 2/2004 | Harris et al. | |
| 2004/0076277 A1 | 4/2004 | Kuusinen et al. | |
| 2004/0236593 A1* | 11/2004 | Swanson et al. | 705/1 |
| 2007/0123284 A1* | 5/2007 | Schliwa-Bertling et al. | 455/518 |

FOREIGN PATENT DOCUMENTS

| | | |
|---|---|---|
| EP | 0 984 608 | 3/2000 |

OTHER PUBLICATIONS

International Search Report from International Application No. PCT/US02/29575, dated Dec. 10, 2002.

International Search Report from International Application No. PCT/US02/36055, dated Apr. 10, 2003.

International Search Report from International Application No. PCT/US03/03021, dated Jun. 18, 2003.

International Search Report from International Application No. PCT/US03/02950, dated Nov. 6, 2003.

U.S. Appl. No. 10/277,465, filed Oct. 22, 2002 entitled "Method for Call Setup Using Short Data Bursts".

Mobile Tornado, http://www.mobiletornado.com/products_iprsptt.html, printed from World Wide Web on Jan. 27, 2003.

"Qualcomm Chats Up 'Push-to-Talk'," http://siliconvalley.internet.com/news/print.php/953261, printed from the World Wide Web on Jan. 27, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G-IP Networks," Internet Engineering Task Force, Internet Draft, Oct. 1999.

Campbell and Sparks, "Control of Service Context Using SIP Request—URI," Network Working Group, Apr. 2001.

Ericsson, vvww.telecomcorridor.com/wireless%20horizons/1Coyne.pdf, printed from the World Wide Web on Jun. 27, 2001.

Dirk Kutscher/Jorg Ott, "The Message Bus—A Communication & Integration Infrastructure for Component-Based Systems," White Paper, Jan. 2000.

Ott et al., "A Message Bus for Local Coordination," Network Working Group, Internet-Draft, May 30, 2001.

TR45, Medium Access Control (MAC) Standard for cdma2000 Spread Spectrum System, IS-2000-3, Jul. 12, 1999.

3rd Generation Partnership Project 2 '3GPP2', "Interoperability Specification (I0S) for CDMA 2000 Access Network Interfaces—Part 3 Features," Nov. 2001.

Perkins, "IP Mobility Support," Internet Engineering Task Force Request for Comment 2002, Oct. 1996.

Perkins, "IP Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task Force Request for Comment 2616, Jun. 1999.

Rigney et al., "Remote Authentication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, "Discussion and Definitions on PoC Floor Control," Input Contribution, Doc #OMA-REQ-2003-0375-PoC_Floor_Control, Jun. 2, 2003.

OMA, "PoC Use case: Mobile—PC Example," Input Contribution, Doc #OMA-REQ-2003-0323 PoC Mobile-PC use case, May 5, 2003.

OMA, "PoC Use case: Multimedia Group Call Example," Input Contribution, Doc #OMA-REQ-2003-0306-PoC UseCase-group-multimedia-scenario, May 6, 2003.

OMA, "PoC Use case: Examples of User Requirements," Input Contribution, Doc #OMA-REQ-2003-0305-PoC Use Case, May 6, 2003.

OMA, "Inputs for PoC Requirements Document," Input Contribution, Doc #OMA-REQ-2003-0367-PoC_Input_Motorola, May 29, 2003.

OMA, "Push to Talk over Cellular (PoC)," Version: 0.1.6, May 12, 2003.

3rd Generation Partnership Project 2 "3GPP2", "Fast Call Set-Up, System Requirements," 3GPP2 S.R0065, Version 1.0, Apr. 15, 2002.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

RTP Header Format (according to RFC 1889)

Fig. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      defined by profile       |            length             |
+-+-+-+-+-+-+-+-+-+-+-+-+-+-+-+-+-+-+-+-+-+-+-+-+-+-+-+-+-+-+-+-+
|                        header extension                       |
|                             ....                              |
```

RTP Header Extension Format (according to RFC 1889)

METHOD AND SYSTEM FOR ACTUALLY IDENTIFYING A MEDIA SOURCE IN A REAL-TIME-PROTOCOL STREAM

REFERENCE TO RELATED APPLICATION

This is a continuation of U.S. patent application Ser. No. 10/629,360, filed Jul. 29, 2003 now U.S. Pat. No. 7,417,989, the entirety of which is hereby incorporated by reference.

BACKGROUND OF THE INVENTION

1. Field of the Invention

The present invention relates to telecommunications and more particularly to real-time protocol (RTP) packet-based media sessions, such as voice-over-IP sessions for instance.

2. Description of Related Art

Conventionally in an RTP media conference, a central conference server will enter into an RTP media session respectively with each of a plurality of client stations. Each client station may then send to the server an RTP media packet stream carrying digitally encoded real-time media (such as voice, audio, and/or video) and/or may receive from the server an RTP media packet stream carrying digitally encoded media.

In many cases, only one station will be allowed to have "the floor" at once, which means that the server will output to the other station(s) the media provided by only one station at a time. Various mechanisms of floor control can be used to govern this process.

Pursuant to Request for Comments (RFC) 1889, published by the Internet Engineering Task Force in January 1996 (entitled "RTP: A Transport Protocol for Real-Time Applications), each packet in an RTP media stream can include an RTP header that includes certain defined fields, including (i) a sequence number, which indicates a position of the packet in the stream, (ii) a timestamp, which indicates the instant when the data in the packet was established (sampled), (iii) a payload type, which indicates the format of the media, to enable a receiving end to play out the media, (iv) a "synchronization source (SSRC) identifier," which is a randomly generated code that distinguishes the source from others in the session, and (v) optionally one or more "contributing source (CSRC) identifiers" indicating the SSRCs of each stream that formed the basis for the RTP stream.

When a conference server receives an incoming RTP media stream from a given station in a conference, each packet of the incoming stream will thus contain a randomly-generated SSRC that uniquely distinguishes the source of that media. The conference server may then send the media in an outgoing RTP media stream to each other participating station, and each packet of the outgoing stream would contain a CSRC correlated with the SSRC indicated in the incoming RTP stream. Each receiving station could thus read the CSRC in order to distinguish the current media source from other media sources that may be participating in the conference.

Unfortunately, however, the only function of an SSRC or CSRC by itself is to distinguish the current media source from others, rather than to actually identify the current media source. For instance, when a station receives an RTP stream, the station can determine from the SSRC or CSRC that the media came from a particular source. However, the station could not tell from the SSRC or CSRC alone what source that was, since the SSRC is simply a randomly generated number that has no meaning outside the context of the RTP stream. Thus, even though RFC 1889 describes the SSRC or CSRC as an "identifier," the SSRC or CSRC does not actually identify the current media source; at best, it only represents the current media source.

In part to allow a receiving station to determine the actual identity of a current talker (rather than to just distinguish the current talker from others), RFC 1889 introduces a control protocol, called the "RTP Control Protocol" (RTCP). According to RFC 1889, RTCP provides for periodically transmitting special control packets to the participants of an RTP session, separate from the RTP stream that the participants are exchanging (i.e., the RTCP control packets are not themselves RTP packets). According to the RFC, each RTCP packet can contain several "source description" (SDES) items, which can specify a direct correlation between an SSRC and a user's actual name, e-mail address or the like.

Thus, a receiving station can receive an RTCP packet that correlates an SSRC with the name of a user who is the source of real-time media, and the receiving station can receive an RTP media stream in which the RTP header of each packet indicates that SSRC. By reference to the correlation specified by the RTCP packet, the receiving station can thereby determine the name of the user.

SUMMARY

The use of RTCP or another such out-of-band control signal to facilitate identifying the current media source in an RTP session can be undesirable, since it forces the receiving station to receive a control stream separately from the media stream and to match up the control stream with the media stream. An exemplary embodiment of the present invention overcomes this problem, by instead (or additionally) setting forth an actual identification of the current media source in an RTP header within the RTP media stream itself.

According to the exemplary embodiment, the actual identification could be an ASCII or other portable representation of the user or station that originated the media, such that the receiving station could readily present that actual identification to a user and the user could understand it. Examples of such actual identifications are (i) the personal name of a user of the originating station, (ii) the e-mail address of the user of the originating station, (iii) the originating station's phone number.

In practice, the actual identification will be set forth in an RTP header of at least one of the packets of the RTP stream being sent between a station and the conference server. By way of example, the actual identification could be set forth in an "RTP packet header extension," which is an optional part of the RTP header defined by RFC 1889.

Thus, for instance, when a station gains the floor and begins sending media in an RTP stream to the conference server, the station may include the actual identification as an RTP header parameter in the first packet of the stream. And when the server then forwards the media in an outgoing RTP media stream to each receiving station, the server may include that actual identification as an RTP header parameter in the first packet of the outgoing media stream. In turn, each receiving station can read the actual identification from the RTP header of the first packet and can present the actual identification to a user.

Further or alternatively, while a station has the floor, it could periodically or sporadically send its actual identification in this same manner, and each receiving station could thereby receive and present the reiterated identification to a user. This would allow for the originating station to change the actual identification mid-stream if so desired.

Still further, it is possible that the server may receive from a sending station an incoming RTP packet that contains the actual identification in an RTP header, and the server may insert that actual identification in the RTP header of a different outgoing RTP packet to each receiving station. (The outgoing packet may, for instance, carry a different portion of the media than the incoming packet.)

And still further, if a sending station does not provide the actual identification in an RTP header, but if the conference server knows or can determine the actual identification, then the conference server could still insert the actual identification into the RTP header of a packet that the conference server sends to a receiving station. Thus, for instance, if the conference server receives an RTP packet that designates an SSRC but does not contain an actual identification, and the conference server receives an RTCP packet that correlates the SSRC with the personal name of a user of the sending station, then the conference server can match the RTCP packet with the RTP packet and thereby determine the personal name of the sender. In accordance with the exemplary embodiment, the conference server may then insert that personal name as an RTP header parameter in an RTP packet of the media stream that it sends to each receiving station. Thus, a receiving station can then conveniently present the sender's name to a user, without having to match the RTP stream up to an RTCP stream.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Example Conferencing System

Figure 1:
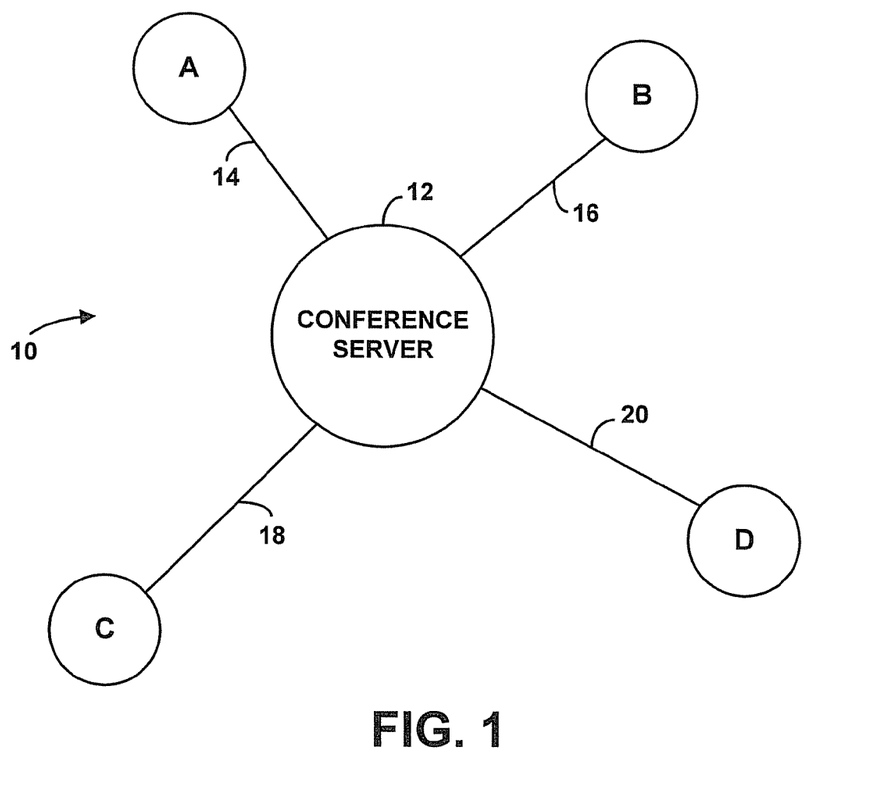
FIG. 1 is a block diagram of a communication system in which the exemplary embodiment can be employed.

Referring to the drawings, FIG. 1 illustrates a simplified block diagram of a communication system 10 in which an exemplary embodiment of the present invention can be employed. System 10 includes at its core a conference server or other central communication server 12, which is arranged to facilitate communication between a number of user stations or client stations. FIG. 1 depicts four exemplary client stations, A, B, C and D. However, server 12 may support communication between more or fewer client stations at a time. (Each station, as well as the conference server, can also be referred to respectively as a "node.")

In the arrangement shown in FIG. 1, the server 12 can receive real-time media in an incoming packet stream from at least one of the client stations and can send the media in an outgoing packet stream to each of the other client stations, thereby facilitating communication between the stations.

In the exemplary embodiment, the incoming and outgoing packet streams that carry the real-time media will be RTP streams, each of which will be made up of a sequence of RTP packets. As is well known in the art, a sending end may establish such an RTP stream from an analog media signal by (i) sampling the media signal to produce a representative bit stream, (ii) encoding the bit stream to produce an encoded bit stream and (iii) packetizing sequential blocks of the encoded bit stream into respective RTP packets. In turn, a receiving end may (i) reassemble the sequential blocks of the encoded bit stream, (ii) decode the bit stream to recover the representative bit stream, and (iii) convert the representative bit stream into an analog signal, and play out the signal to a user.

Figure 2:
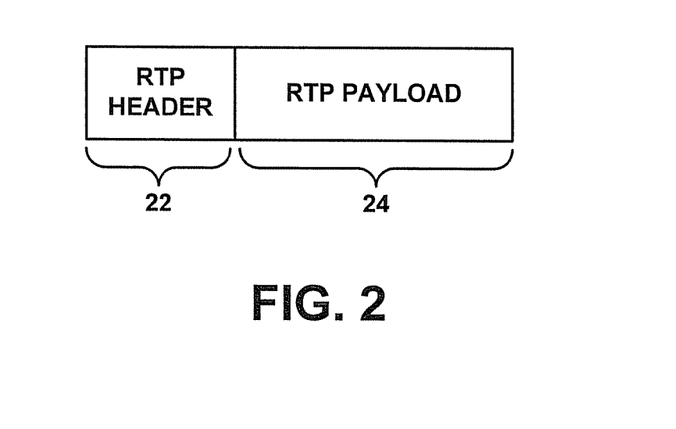
FIG. 2 is an illustration of an RTP packet that could be conveyed between nodes in accordance with the exemplary embodiment.

Generally, each RTP packet will include an RTP header section 22 and an RTP payload section 24, as depicted in FIG. 2. The RTP payload section will include media payload data representing a portion of the underlying media signal. And the RTP header section will include information about the RTP packet, including (i) a sequence number, (ii) a timestamp, (iii) payload format information, and (iv) a code that represents but does not actually identify the source of the underlying media. Further, the RTP header may optionally include other information as well.

Figure 3:
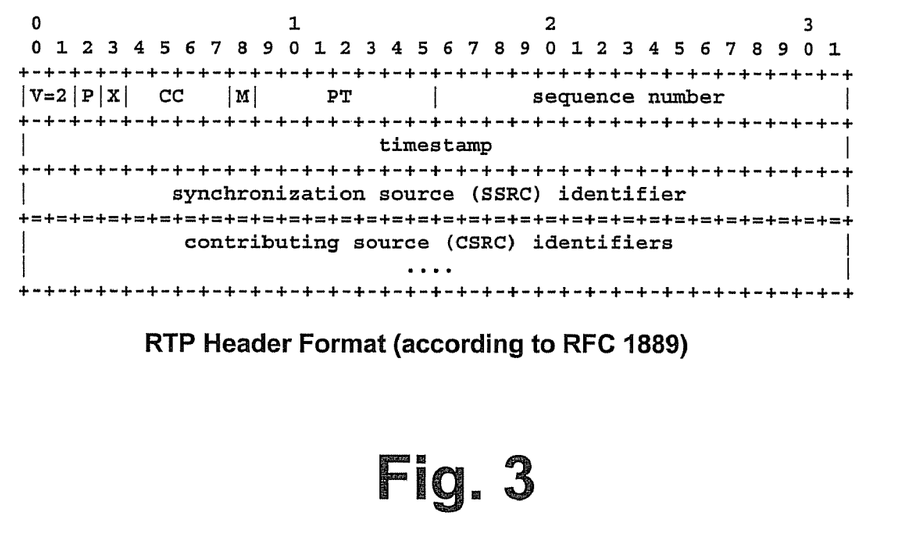
FIG. 3 is an illustration of the RTP header structure defined by RFC 1889.
Figure 4:
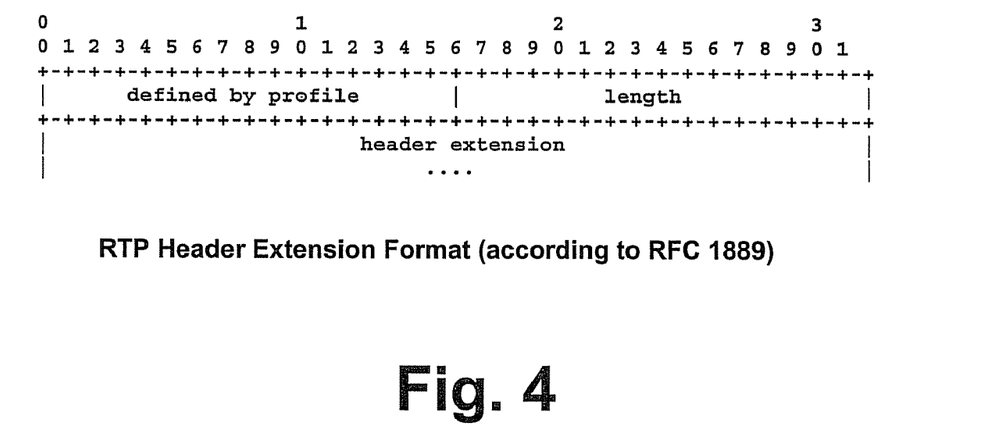
FIG. 4 is an illustration of the RTP header extension structure defined by RFC 1889.

An exemplary RTP header may, but need not, take the form specified in RFC 1889, which is illustrated in FIGS. 3 and 4. In particular, according to RFC 1889, each RTP header would include the following "fixed header fields" as shown in FIG. 3:

(1) A 2-bit VERSION field ("V"), which identifies the version of RTP.

(2) A 1-bit PADDING field ("P"), which can be set to indicate that the packet includes one or more additional padding octets at the end which are not part of the payload.

(3) A 1-bit EXTENSION field ("X"), which can be set to indicate that the fixed header is followed by exactly one RTP header extension.

(4) A 4-bit CSRC COUNT field ("CC"), which indicates the number of CSRC identifiers that follow the fixed header.

(5) A 1-bit MARKER field ("M"), which can be set to mean that certain parts of the payload, such as frame boundaries, are marked.

(6) A 7-bit PAYLOAD TYPE field ("PT"), which identifies the format of the RTP payload and determines its interpretation by the receiving application.

(7) A 16-bit SEQUENCE NUMBER, which increments by one for each RTP packet sent, and which may be used by the receiver to detect packet loss and to restore packet sequence.

(8) A 32-bit TIMESTAMP, which reflects the sampling instant of the first octet in the RTP data packet.

(9) A 32-bit SSRC identifier, which is a randomly chosen code that uniquely identifies the source of the RTP stream (10) A list of 0 to 15 CSRC identifiers, each 32 bits, and each uniquely identifying a contributing source for the payload contained in the packet. CSRC identifiers are inserted by mixers, using the SSRC identifiers of contributing sources.

Further, according to RFC 1889, an RTP header may then also include an RTP header extension. More specifically, as shown in FIG. 4, the RTP header could include the following additional fields after the CRSC field:

(11) A 16-bit field that can be used to distinguish the type of header extension.
(12) A 16-bit LENGTH field, which indicates the number of 32-bit words in the header extension.
(13) A HEADER EXTENSION field, which RFC 1889 does not define.

(For more details, the reader can refer to RFC 1889, which is hereby incorporated herein by reference.)

As an entity generates an RTP stream, the entity can transmit the stream to another entity through a transport mechanism, such as UDP/IP for instance. In that case, each RTP packet could be wrapped in a respective UDP header and a respective IP header. Alternatively, multiple RTP packets could be combined together in a single UDP/IP packet, or an RTP packet could be divided among multiple UDP/IP packets. Still alternatively, some other transport mechanism could be used.

As further illustrated in FIG. 1, stations A, B, C, and D have respective communication links 14, 16, 18, 20 with server 12. These links can take various forms and can include wireless and/or landline components. Further, the links could coincide with each other in part, such as by extending over a common network for instance.

For example, some or all of the stations could be 3G wireless terminals that have assigned mobile-IP addresses on a packet-switched network, and the server 12 may have an assigned IP address on the network as well. In that case, an RTP stream could pass between a station and the server over a path that comprises a wireless air interface, a radio access network and the packet-switched network.

As another example, some or all of the stations could be landline personal computers or Ethernet-telephones, which could similarly have assigned IP addresses. In that case, an RTP stream might pass between a station and the server over a path that comprises a local area network (LAN) or other access channel and the packet-switched network.

As still another example, some or all of the stations could be coupled with the server via a circuit-switched connection. In that case, an RTP stream might pass between a station and the server over a point-to-point protocol (PPP) or serial line interface protocol (SLIP) data link, or over some other protocol. Other examples are possible as well.

Figure 5:
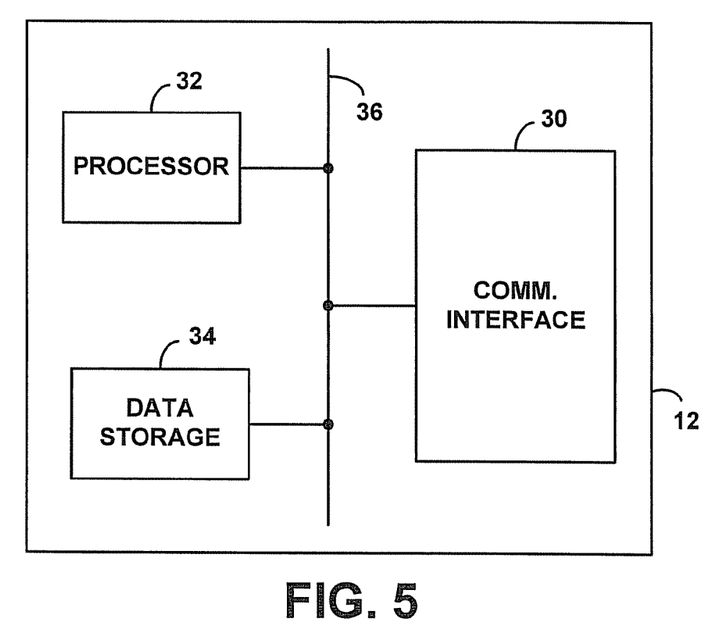
FIG. 5 is a block diagram of an exemplary conference server that can be employed in the arrangement of FIG. 1.

Referring next to FIG. 5, a generalized block diagram of a representative conference server 12 is shown. As illustrated, exemplary server 12 includes a communication interface 30, a processor 32, and data storage 34, all tied together via a system bus or other mechanism 36.

Communication interface 30 provides server 12 with a physical connection for communicating with stations A, B, C and D. As such, the communication interface 30 may take various forms, depending on factors such as the type of links 14, 16, 18, 20 between server 12 and the stations, and the manner of communication with the stations. For example, if the stations are all nodes on an IP network, communication interface 30 might comprise a simple Ethernet network interface module that provides connectivity with that network. Alternatively, if the stations are coupled more directly with the server, then the communication interface might comprise discrete ports tied to each of the direct links. Other examples are possible as well.

Data storage 34 (e.g., volatile and/or non-volatile storage), in turn, preferably holds machine language instructions (program instructions) and/or other logic executable by processor 32 to carry out various functions described herein. (Alternatively or additionally, some such functions could be carried out by hardware and/or firmware).

For example, data storage 34 may include logic executable by the processor to set up and tear down RTP communications with the various stations. This logic can vary depending on the type of links and transport mechanism used for communication. For instance, the logic could be a SIP client application, which is well known in the art. As such, the processor could receive a SIP "INVITE" from a station seeking to set up an RTP session, the processor could respond to the SIP INVITE with a SIP "200 OK" signaling acceptance of the request, and the processor could then receive a SIP "ACK" to conclude the setup signaling. Similarly, the processor could send a SIP INVITE to a station in an effort to set up an RTP session, the processor could receive a SIP 200 OK in response, and the processor could then send a SIP ACK to conclude the setup signaling. Other signaling protocols could be used instead.

Further, data storage 34 may include logic executable by the processor to set up, control, and facilitate a group conference session. Applying this logic, for example, the processor may receive an INVITE from station A, asking to establish an RTP conference with stations B, C and D. (The INVITE may specify the type of session desired, such as an RTP with particular media encoding for instance, using the well known session description protocol (SDP)). In response, the processor may send an INVITE respectively to each of stations B, C and D, seeking to set up an RTP session respectively with each of those stations. Upon receipt of a 200 OK from each of the invited stations, the processor may then affirmatively respond to station A with a 200 OK. And upon receipt of an ACK from station A, the processor may then send an ACK respectively to each of stations B, C and D. In this manner, the server can establish an RTP leg respectively with each of the conference participants.

The logic may then also define a floor control mechanism, which would enable processor 32 to control which of the participating stations has the floor at any given moment during the conference. Applying this logic, for example, the processor might grant the floor initially to the station that initiates the conference, and the processor may allow that station to maintain the floor for up to a predetermined time period or until the station releases the floor by discontinuing RTP transmission to the server. In turn, the processor could then grant the floor to the first station to thereafter begin RTP transmission to the server.

When a station has the floor, processor 32 would receive media in an incoming RTP stream from the station and would send the media in an outgoing RTP stream to each of the other participating stations. For example, if station A has the floor, then as the processor receives an RTP stream over TCP/IP from station A, (i) the processor could read the RTP header section and RTP payload section from each incoming packet, (ii) the processor could revise the RTP header of each packet to specify the server 12 as the source (e.g., SSRC) of the packet and station A as the source of the enclosed media (e.g., CSRC), and (iii) the processor could then send the revised RTP packet over TCP/IP to each of the other stations.

Note that the conference server 12 could take other forms as well. For instance, the conference server function could be embodied in a gateway, proxy or other network entity through which communications pass between communicating stations. Thus, as an RTP stream passes through the server, the server could insert in the stream an actual identification, so that the receiving station can receive the actual identification as part of the RTP stream.

Figure 6:
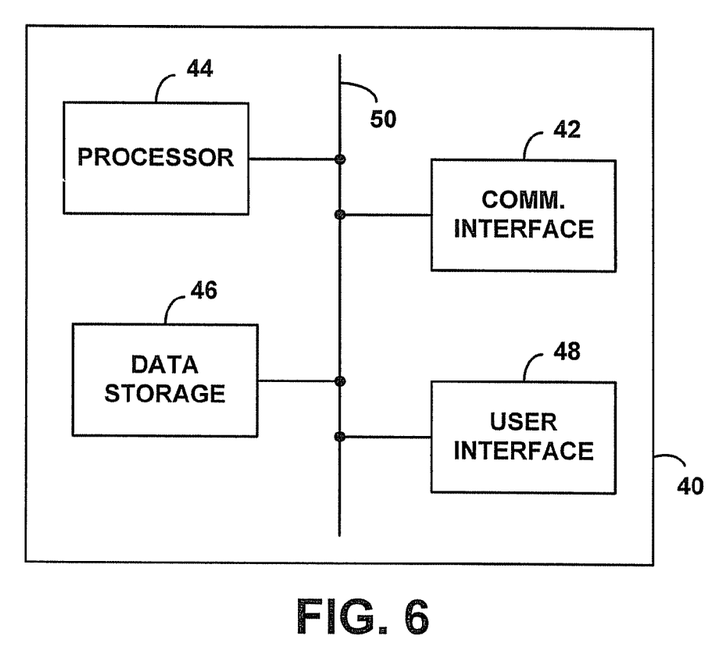
FIG. 6 is a block diagram of an exemplary client station that can be employed in the arrangement of FIG. 1.

Referring next to FIG. 6, a generalized block diagram of a representative client station 40 is shown. Client station 40 includes a communication interface 42, a processor 44, data storage 46 and a user interface 48, all of which may be tied together by a system bus or other mechanism 50.

Communication interface 42 provides station 40 with a physical connection for communicating with server 12. As such, communication interface 42 may take various forms. For example, if the station is a landline station that is coupled by an Ethernet link to a packet-switched network, then the communication interface 42 might be a simple Ethernet network interface module. As another example, if the station is a wireless terminal, then the communication interface might include an antenna and a chipset arranged to send and receive wireless signals according to a designated wireless protocol, such as CDMA, TDMA, 802.11 or the others.

Data storage 46 (e.g., volatile and/or non-volatile storage), in turn, contains machine language instructions that are executable by processor 44 to carry out various functions described herein. (As with the logic in the server, some of these functions could alternatively be embodied in hardware and/or firmware).

For example, data storage 46 may include logic executable by the processor to set up and tear down RTP communications with server 12. As with server 12, this logic might comprise a SIP client application. Thus, applying this logic, the processor may send a SIP INVITE to the server to initiate an RTP conference, the processor may receive a SIP 200 OK from the server, and the processor may send a SIP ACK to the server, thereby establishing an RTP conference leg with the server. Similarly, the processor may receive a SIP INVITE from the server seeking to establish an RTP conference leg, the processor may respond with a SIP 200 OK, and the processor may then receive a SIP ACK, thus completing setup of the requested RTP leg.

Further, the data storage 46 preferably includes logic to establish an RTP stream representing a real-time media, and to recover and play out real-time media from an RTP stream. Applying this logic, for instance, processor 44 may receive a digitized media signal from user interface 48 or from data storage 46 and may produce a representative RTP stream in the manner described above for instance, for transmission to another entity. Similarly, processor 44 may receive an RTP stream from another entity and may recover and play out the underlying media, also in the manner described above.

User interface 48, in turn, preferably functions to interface with a user of the client station, so as to allow the user to engage in real-time media communication with a user of another station. Thus, for instance, user interface 48 may include media input components such as a video camera and a microphone, as well as associated technology to digitize media received through these components. Similarly, user interface 48 may include media output components such as a display screen and a loudspeaker, as well as associated technology to convert digital media representations to analog form for presentation through these components.

In the exemplary embodiment, the user interface 48 will further include a floor-control mechanism, such as a button or other trigger that a user can engage in order to initiate a conference and/or to request the floor in an existing conference. User invocation of the floor-control mechanism preferably sends an interrupt to processor 44 or otherwise causes processor 44 to initiate a conference and to begin generating and sending an RTP stream to server 12 or, if a conference is already underway, to begin generating and sending an RTP stream to server 12. In the exemplary embodiment, processor 44 would not begin sending an RTP stream to server 12 if processor 44 is already receiving an RTP stream from server 12, i.e., if another station already has the floor.

The arrangement shown in FIG. 1 is generally representative of a conferencing system in which the exemplary embodiment can be employed. A more specific example is now shown in FIG. 7.

Figure 7:
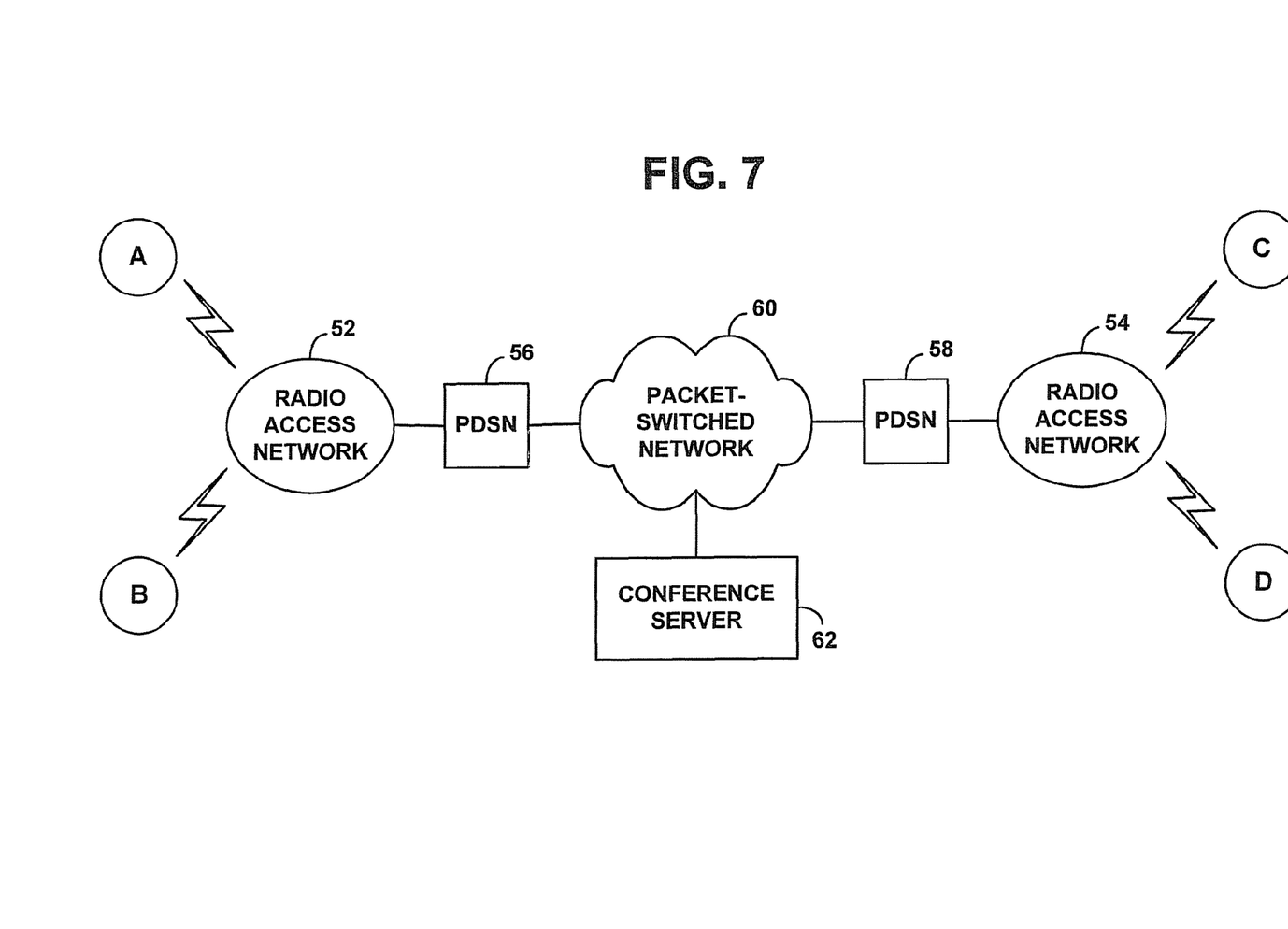
FIG. 7 is a block diagram of a wireless communication system in which the exemplary embodiment can be employed.

FIG. 7 depicts a wireless communication system, in which stations A, B, C and D are each 3G wireless handsets having the ability to invoke and participate in an RTP conference as described above. In the arrangement of FIG. 7, by way of example, stations A and B are served by a common radio access network 52, and stations C and D are served by another radio access network 54. Each radio access network is then coupled via a respective packet data serving node (PDSN) 56, 58 to a common packet-switched network 60, which could be a private network operated by a wireless carrier that serves stations A, B, C and D. And sitting on the packet-switched network is a conference server 62.

Conventionally, each wireless handset could have an assigned mobile device number (MDN), which could function as a phone number of the device and/or as a device identifier generally. Typically, the MDN would be programmed into the device, and the wireless carrier would maintain a record of the MDN together with service information for the given handset. When the handset sends packet data into network 60, the packet data might carry the MDN of the handset, which can indicate that the packet data originated from the given handset.

Each such wireless handset might include an instant-chat button that a user can engage in order to initiate an instant-chat session. In response to the user engaging the button, the handset may send a SIP INVITE via the radio access network and PDSN to the server 62, requesting a group conference session. Server 62 may then refer to a group data store (not shown) to identify members of the initiating user's group, and server 62 may engage in SIP signaling to set up RTP legs with each member and with the initiating user.

With the conference set up, the initiating handset may then receive media such as voice from the user and send the media in an RTP stream to server 62, and the server may forward that media in an outgoing RTP stream to each other handset. When the initiating user stops talking, server 62 may then grant the floor to the next handset that begins sending media in an RTP stream to the server, and the server may forward that media to each other handset.

2. Passing Actual Identification in RTP Header

In accordance with the exemplary embodiment, an actual identification of the user or station that has the floor will be carried in an RTP header that is passed between a station and the conference server. The actual identification can thus flow in an RTP header from a station to the server and/or from the server to a station.

For example, the station that has the floor can insert the actual identification into an RTP header within an RTP stream that it passes to the server, and the server can forward that actual identification in an RTP header within an outgoing RTP stream. As another example, the server could otherwise learn the actual identity of the user or station that has the floor (such as by using RTCP, for instance) and could insert the actual identification into an RTP header within an outgoing RTP stream. And as still another example, a receiving station could receive an RTP stream, could read the actual identification from an RTP header and could present the actual identification to a user.

Figure 8:
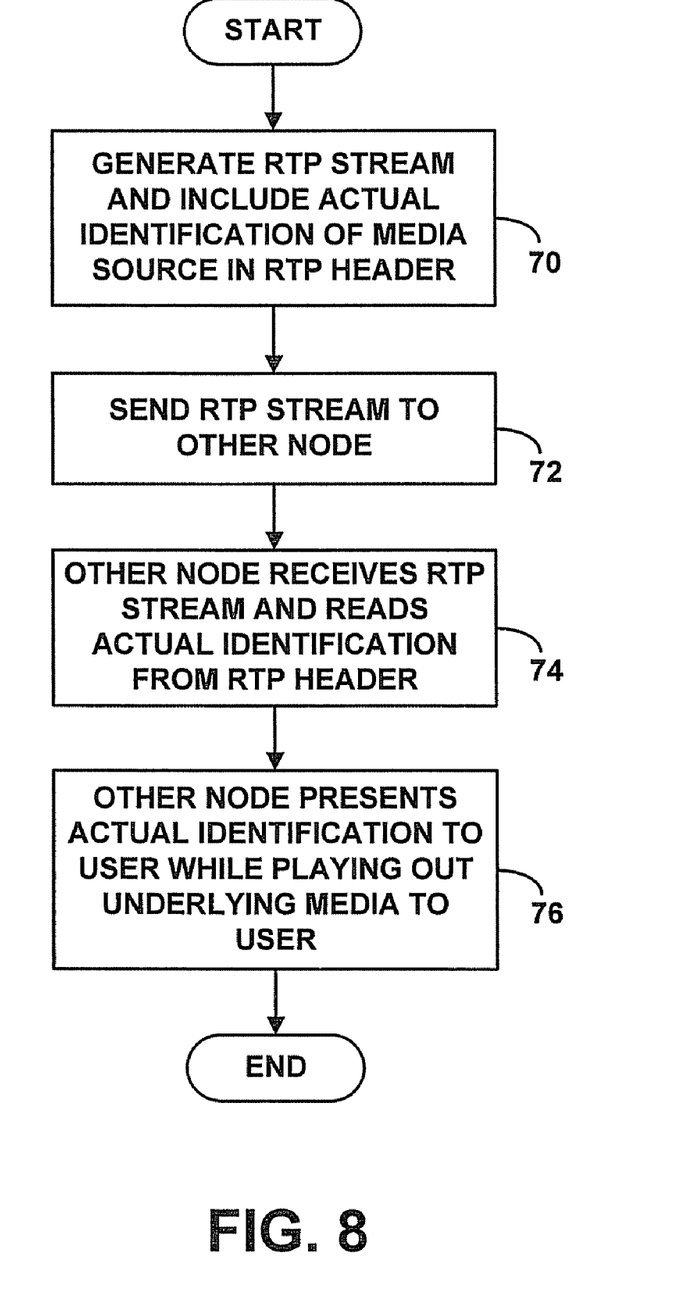
FIG. 8 is a flow chart depicting functions that could be carried out in accordance with the exemplary embodiment.

FIG. 8 is a flow chart depicting a general example of this process. As shown in FIG. 8, at block 70, a first node generates an RTP stream carrying real-time media and inserts an actual identification into an RTP header within the stream. At block 72 (preferably as the first node generates the RTP stream) the first node sends the RTP stream, including the actual identification in the RTP header, to a second node. At block 74, the second node receives the RTP stream and reads the actual identification from the RTP header. And at block 76, the second node presents the actual identification to a user while the second node is playing out the real-time media to the user.

a. Actual Identification

The actual identification of the user or station that has the floor is preferably an identification that is human-understandable, rather than being a randomly generated number such as an SSRC that has no meaning to a human. As further noted above in part, examples of such actual identifications are (i) the personal name (full name, nickname, screen-name, etc.) of a user of the station that has the floor, (ii) the e-mail address of the user or of the station, and (iii) a phone number of the user or of the station. However, other examples are possible as well.

b. Preferred Format and Placement

The actual identification could be set forth anywhere in the RTP header. For instance, the actual identification can be set forth in a header extension of an RTP header. According to RFC 1889, the "X" bit of the RTP header would then be set to indicate the inclusion of the header extension. A receiving entity (such as the server or a client station) that detects the X bit set can then read the actual identification from the header extension.

As noted above, the actual identification can be inserted into the RTP header as a text representation of the actual identification. In this regard, the actual identification could be inserted as a sequence of ASCII codes, each of which represents a given text character (e.g., letter, number or other symbol). The process of producing text from a sequence of ASCII codes is a basic computing function. Therefore, for all practical purposes, the process of inserting a sequence of ASCII codes is an example of the process of inserting the corresponding text string.

Preferably, actual identification will be included in the first RTP packet of a given RTP stream, that is, in the first RTP packet that a station sends once a station gains the floor. Further, the actual identification could be included periodically thereafter (such as every 4 seconds) or sporadically. At an extreme, the actual identification could be included in every RTP packet of a stream, but doing so could unnecessarily use processing resources and communication bandwidth.

It is also possible that the actual identification information could be set forth in a combination of RTP headers. For instance, half of the identification may be set forth in the RTP header of one RTP packet, and the other half of the identification may be set forth in the RTP header of a next RTP packet. Further, the actual identification could be encoded, although the endpoint that will ultimately present the actual identification to a user should then preferably be able to decode the identification so as to be able to present it.

An exemplary header extension that can be used to convey the actual identification of the user or station that has the floor, within the wireless communication system of FIG. 7 for instance, includes the following fields:

(1) A 16-bit HEADER-EXTENSION TYPE field, which identifies this type of header extension as an actual identification.
(2) A 16-bit LENGTH field, which indicates the number of 32-bit words in the header extension.
(3) An 8-bit ENTRY-LENGTH field, which indicates the total bytes in the entry, including the ENTRY-LENGTH field. This value is preferably a multiple of four, since the TEXT field noted below is preferably padded to an even quadword.
(4) An 8-bit MDN-LENGTH, which indicates the number of significant digits that compose the MDN in the next field.
(5) An MDN field, which indicates the wireless handset's mobile device number (e.g., phone number), encoded as binary coded decimal. The MDN may then be used as an index for subsequent speaker identification.
(6) An 8-bit ID-TYPE field, which identifies how the identifying text should be interpreted. Example values for this field include:
  (i) SPKRID_DISPLAY, which indicates that the identifying text should be displayed on client devices whenever this CSRC is speaking
  (ii) SPKRID_GROUP, which indicates that the identifying text is associated with a group being called.
  (iii) SPKRID_EMAIL, which indicates that the identifying text is the e-mail contact information for the conference participant.
(7) A variable length TEXT field, which contains the actual identification of the speaker. This field is terminated by one or more NULL (zero) bytes. The header extension may contain zero or more text entries, each with an ID-TYPE and null-terminated TEXT. The final TEXT entry should be padded so that the next byte is aligned to begin a quadword.

c. Implementation on a Client Station

The exemplary embodiment can be implemented at least in part on a client station, such as station A, B, C or D, by adding additional logic in data storage 46 to be executed by processor 44, or by adding logic to the station in some other form such as firmware or hardware for instance. Applying this logic, processor 44 can insert an actual identification in an RTP header within an RTP stream that it outputs, and/or processor 44 can read an actual identification from an RTP header within an RTP stream that it receives and can present the actual identification to a user.

In order to be able to insert an actual identification into an RTP header, processor 44 should first learn what identification to insert. The processor could learn the actual identification from user-input, from predefined data storage, or in some other way. For instance, the user might invoke a setup application on the station through which the user could specify an actual identification to be used, and the processor could store that actual identification for later use. Alternatively, the station might otherwise be programmed in advance with the actual identification, such as a phone number or e-mail address of the station.

In turn, when processor 44 then generates and outputs an RTP stream, the processor may include the actual identification in at least one RTP header within the stream in the manner noted above.

Further, when the processor 44 receives an RTP stream, the processor may detect that the "X" bit in the RTP header is set and may then determine from the header extension type field in the header extension that the RTP header includes actual identification information. The processor may then read the ID-TYPE value and TEXT value from the header extension and responsively present the TEXT value to a user, via user interface 48 (e.g., on a display screen). Preferably, the receiving user will thus see the actual identification of the user or station that has the floor, at the same time as the receiving station plays out the media from the RTP stream.

d. Implementation on the Server

The exemplary embodiment can also be implemented, at least in part, on a conference server, such as server 12 (e.g., server 62), by adding additional logic in data storage 34 to be executed by processor 32, or by adding logic to the server in some other form such as firmware or hardware for instance. Applying this logic, the processor could determine the actual identification of the user or station that has the floor, and the processor could then insert that actual identification into an RTP header within an outgoing RTP stream.

Processor 32 could determine the actual identification of the user or station that currently has the floor in various ways. For example, the processor could receive the actual identification in an RTP header within an incoming RTP stream, and the processor could read that actual identification. As another example, the processor could read the SSRC from the RTP header within an incoming RTP stream, and the processor could receive an RTCP packet that correlates that SSRC with the actual identification. As still another example, the processor could have access to data that correlates another sort of user or station identifier (e.g., IP address, SIP address, NAI, etc.) with actual identification information, and, if the incoming RTP stream specifies or is accompanied by the identifier, the processor could thus translate the identifier into actual identification information. Other examples are also possible.

Given the actual identification of the user or station that has the floor, the processor may then insert that actual identification into an RTP header within an outgoing RTP stream in the manner noted above. In this regard, if the processor reads the actual identification from the RTP header of a given incoming RTP packet (carrying given media payload), the processor could insert the actual identification into the RTP header of a corresponding outgoing packet (carrying the same media payload). Alternatively, the processor could read the actual identification from a given incoming RTP packet and could insert the actual identification into the RTP header of any other outgoing RTP packet in the stream.

Further, the processor could change the actual identification from one actual identification to another before inserting the actual identification into an RTP header. For instance, the processor could receive in an incoming RTP header the personal name of the user who currently has the floor, and, by reference to a group data table, the processor could expand that actual identification to specify both the user's name and the station's phone number, or both the user's name and the user's group name. The processor could then insert into the outgoing RTP header the modified actual identification. Other examples are possible as well.

In the exemplary embodiment, the processor could also receive a signal from the station that has the floor, indicating how often the station will be sending actual identification information. The station could send such a signal within a SIP INVITE to the server, for instance. With knowledge of how often the sending station will be sending actual identification information, the server can then efficiently look for the information that often.

3. Acknowledgement of Actual Identification

In accordance with the exemplary embodiment, when a sending node sends an actual identification to a receiving node, the receiving node can acknowledge receipt of the actual identification. For example, the receiving node can send an RTP packet to the sending node, including in an RTP header of the packet a predefined acknowledgment code of some sort. Alternatively, the receiving node could send an acknowledgment in some other way.

Further in accordance with the exemplary embodiment, the sending node could be arranged to continuously include the actual identification in sequential packets of the sequence (e.g., in every packet, or in every nth packet) and to stop including the actual identification upon receipt of the acknowledgement from the receiving node.

4. Conclusion

An exemplary embodiment of the present invention has been described above. Those skilled in the art will understand, however, that changes and modifications may be made to this embodiment without departing from the true scope and spirit of the present invention, which is defined by the claims.

For example, although the foregoing discussion is focused on providing an actual identification in an RTP header within an RTP stream being sent between a client station and a server, the exemplary embodiment could be applied more generally when two client stations are communicating directly with each other. For instance, when one client station sends an RTP stream to another client station, the sending station could include within an RTP header an actual identification of the sending station or of a user of the sending station. The receiving station can then read and present that actual identification to a user of the receiving station.

Other examples are possible as well.

I claim:

1. In a transmission system of the type in which a sending node sends a digital representation of real-time media to a receiving node in a sequence of Real Time Protocol (RTP) packets, wherein each RTP packet includes (a) a portion of the digital representation and (b) an RTP header containing information about the RTP packet including (i) a sequence number, (ii) a timestamp, (iii) payload format information, and (iv) a code that represents but does not actually identify a source of the real-time media, a method comprising:
   the sending node including in the RTP header of at least one packet of the sequence of RTP packets an actual identification of the source of the real-time media; and
   the sending node transmitting the at least one packet, including the actual identification in the RTP header, to the receiving node.

2. The method of claim 1, wherein the source of the real-time media is selected from the group consisting of the sending node and a user of the sending node.

3. The method of claim 1, wherein the sending node is a conference server, wherein the conference server receives the real-time media from a client station, and wherein the source of the real-time media is selected from the group consisting of the client station and a user of the client station.

4. The method of claim 1, wherein the sending node is a first client station, and the receiving node is a conference server.

5. The method of claim 1, wherein the sending node is a client station and the receiving node is a client station.

6. The method of claim 1, wherein the actual identification of the source comprises a text representation of the source.

7. The method of claim 6, wherein the text representation comprises a text indication of a value selected from the group consisting of (i) a personal name, (ii) an e-mail address and (iii) a phone number.

8. The method of claim 1, wherein each RTP header includes a set of fixed header fields, and wherein including in the RTP header of at least one packet of the sequence of RTP packets stream an actual identification of the source of the real-time media comprises including the actual identification in an RTP header extension after the set of fixed header fields.

9. The method of claim 1, wherein the sequence of RTP packets includes a first packet, and wherein including in the RTP header of at least one packet of the RTP stream an actual identification of the source of the real-time media comprises:
including the actual identification in the RTP header of the first packet of the sequence of RTP packets.

10. The method of claim 1, wherein including in the RTP header of at least one packet of the sequence of RTP packets stream an actual identification comprises:
including the actual identification in RTP headers periodically throughout the sequence of RTP packets.

11. The method of claim 1, wherein the real-time media is selected from the group consisting of voice, audio and video.

12. A machine comprising:
a communication interface;
a processor;
data storage;
machine language instructions stored in the data storage and executable by the processor to perform functions including:
establishing a Real Time Protocol (RTP) stream carrying a digital representation of real-time media, the RTP stream comprising a sequence of RTP packets, each RTP packet including a portion of the digital representation and including an RTP header specifying (i) a sequence number, (ii) a timestamp, (iii) payload format information, and (iv) a code that represents a source of the real-time media but that does not actually identify the source;
including in the RTP header of at least one RTP packet of the RTP stream an actual identification of the source of the real-time media; and
outputting the RTP stream, including the at least one RTP packet containing the actual identification in its RTP header, for transmission via the communication interface to another machine.

13. The machine of claim 12, wherein the actual identification is selected from the group consisting of (i) a personal name, (ii) an e-mail address and (iii) a phone number.

14. The machine of claim 12, wherein the actual identification of the source comprises a text representation of the source.

15. The machine of claim 12, wherein each RTP header includes a set of fixed header fields, and wherein including in the RTP header of at least one RTP packet of the RTP stream an actual identification of the source of the real-time media comprises including the actual identification in an RTP header extension after the set of fixed header fields.

16. In a conference server of the type that receives real-time media in an incoming Real Time Protocol (RTP) stream from a sending station and forwards the real-time media in an outgoing RTP stream to at least one receiving station, wherein each RTP stream comprises a sequence of packets each carrying a digital representation of a portion of the real-time media and each having an RTP header that includes (i) a sequence number, (ii) a timestamp (iii) payload format information, and (iv) a synchronization source identifier code, a method comprising:
determining an actual identification of a source of the real-time media; and
inserting the actual identification into an RTP header of at least one RTP packet of the outgoing RTP stream.

17. The method of claim 16, wherein the actual identification comprises a value selected from the group consisting of (i) a personal name of a user of the sending station, (ii) an e-mail address of the user of the sending station and (iii) a phone number of the sending station.

18. The method of claim 16, wherein determining the actual identification of the source comprises:
receiving the actual identification in an RTP header of an RTP packet of the incoming RTP stream.

19. The method of claim 16, wherein each RTP header includes a set of fixed header fields, and wherein inserting the actual identification into an RTP header of at least one RTP packet of the outgoing RTP stream comprises inserting the actual identification in an RTP header extension after the set of fixed header fields.

20. The method of claim 16, wherein the real-time media is selected from the group consisting of voice, audio and video.

21. In a transmission system of the type in which a client station receives a Real Time Protocol (RTP) stream carrying a digital representation of real-time media and the client station uncovers the real-time media from the RTP stream and plays out the real-time media to a user, wherein the RTP stream comprises a sequence of RTP packets each containing (a) a portion of the digital representation and (b) an RTP header that includes (i) a sequence number, (ii) a timestamp, (iii) payload format information and (iv) a synchronization source identifier code, a method comprising:
the client station reading, from an RTP header of at least one RTP packet of the RTP stream, an actual identification of a source of the real-time media; and
the client station then presenting the actual identification to the user while the client station is playing out the real-time media to the user.

22. The method of claim 21, wherein the actual identification is selected from the group consisting of (i) a personal name, (ii) an e-mail address and (iii) a phone number.

23. The method of claim 21, wherein the actual identification of the source comprises a text representation of the source.

24. The method of claim 21, wherein each RTP header includes a set of fixed header fields, and wherein reading the actual identification from an RTP header of at least one RTP packet of the RTP stream comprises:
reading the actual identification from an RTP header extension following the set of fixed header fields.

25. A machine comprising:
a communication interface for receiving a Real Time Protocol (RTP) stream carrying a digital representation of real-time media, the RTP stream comprising a sequence of RTP packets each containing a portion of the digital representation and each having an RTP header including (i) a sequence number, (ii) a timestamp, (iii) payload format information and (iv) a synchronization source identifier code, wherein the RTP header of at least one RTP packet of the RTP stream further includes an actual identification of a source of the real-time media;
means for uncovering the real-time media from the RTP stream and playing out the real-time media to a user;
means for reading the actual identification from the RTP header; and
means for presenting the actual identification to the user while playing out the real-time media to the user.

26. The machine of claim 25, wherein the means for uncovering, means for reading and means for presenting comprise a programmed processor.

* * * * *